United States Patent
Lee et al.

(10) Patent No.: US 10,459,650 B2
(45) Date of Patent: Oct. 29, 2019

(54) DATA OPERATION METHOD AND ELECTRONIC DEVICE

(71) Applicant: SAMSUNG ELECTRONICS CO., LTD., Suwon-si, Gyeonggi-do (KR)

(72) Inventors: Woo Joong Lee, Seoul (KR); Dae Ho Jeong, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 48 days.

(21) Appl. No.: 15/322,268

(22) PCT Filed: Jul. 17, 2015

(86) PCT No.: PCT/KR2015/007455
§ 371 (c)(1),
(2) Date: Dec. 27, 2016

(87) PCT Pub. No.: WO2016/013815
PCT Pub. Date: Jan. 28, 2016

(65) Prior Publication Data
US 2017/0139634 A1    May 18, 2017

(30) Foreign Application Priority Data

Jul. 24, 2014 (KR) .................. 10-2014-0094173

(51) Int. Cl.
*G06F 3/00*    (2006.01)
*G06F 3/06*    (2006.01)
*G06F 11/20*    (2006.01)

(52) U.S. Cl.
CPC .......... *G06F 3/0643* (2013.01); *G06F 3/0604* (2013.01); *G06F 3/0625* (2013.01); *G06F 3/0673* (2013.01); *G06F 11/2015* (2013.01)

(58) Field of Classification Search
None
See application file for complete search history.

(56) References Cited

U.S. PATENT DOCUMENTS

| | | | |
|---|---|---|---|
| 5,519,853 A | 5/1996 | Moran et al. | |
| 6,219,693 B1* | 4/2001 | Napolitano | G06F 3/0611 709/203 |
| 7,433,898 B1 | 10/2008 | Georgiev | |
| 8,392,479 B1 | 3/2013 | Pantin | |

(Continued)

FOREIGN PATENT DOCUMENTS

| | | |
|---|---|---|
| JP | 2003-122647 | 4/2003 |
| JP | 2011-070318 | 4/2011 |
| WO | WO 2013/036046 | 3/2013 |

OTHER PUBLICATIONS

Extended Search Report dated Jan. 11, 2018 in counterpart European Patent Application No. 15824756.9.

(Continued)

*Primary Examiner* — Midys Rojas
(74) *Attorney, Agent, or Firm* — Nixon & Vanderhye, P.C.

(57) ABSTRACT

A data operation method and an electronic device are provided. The method includes assigning a reserved area of a memory of an electronic device, which receives power associated with maintaining a data write state when the supply of a main power is blocked to a file system of a RAMDisk associated with processing a data input/output (I/O) and controlling file processing of the file system of the RAMDisk.

18 Claims, 6 Drawing Sheets

(56) References Cited

U.S. PATENT DOCUMENTS

| | | | |
|---|---|---|---|
| 8,468,334 B1 | 6/2013 | Jonna et al. | |
| 8,505,003 B2 | 8/2013 | Bowen | |
| 9,292,275 B2 | 3/2016 | Bowen | |
| 9,864,979 B2 * | 1/2018 | Sasaki | G06Q 20/20 |
| 2005/0289152 A1 | 12/2005 | Earl et al. | |
| 2008/0077590 A1 | 3/2008 | Pandit | |
| 2009/0055452 A1 | 2/2009 | Tang et al. | |
| 2009/0089338 A1 | 4/2009 | Ranade et al. | |
| 2009/0106758 A1 | 4/2009 | Giampaolo | |
| 2010/0241613 A1 | 9/2010 | Rao | |
| 2011/0271270 A1 | 11/2011 | Bowen | |
| 2013/0318515 A1 | 11/2013 | Bowen | |
| 2014/0223232 A1 | 8/2014 | Kwon et al. | |
| 2016/0274896 A1 | 9/2016 | Bowen | |

OTHER PUBLICATIONS

Communication pursuant to Article 94(3) EPC dated Oct. 31, 2018 in counterpart European Patent Application No. 15824756.9.

* cited by examiner

DATA OPERATION METHOD AND ELECTRONIC DEVICE

This application is the U.S. national phase of International Application No. PCT/KR2015/007455 filed 17 Jul. 2015, which designated the U.S. and claims priority to KR Patent Application No. 10-2014-0094173 filed 24 Jul. 2014, the entire contents of each of which are hereby incorporated by reference.

TECHNICAL FIELD

The present disclosure relates to operating data.

BACKGROUND ART

Electronic devices such as smartphones and tablet personal computers (PCs) provide a plurality of useful functions to their users through various applications. Such electronic devices operate various data based on performing the functions.

In connection with operating data, an electronic device moves and stores data stored in its storage (e.g., a non-volatile memory) in its memory (e.g., a volatile memory) or moves and stores data stored in the memory in the storage. In general, user data such as music, moving images, and photos are stored on a conventional file system based on an asynchronous write mode. A database file, a system configuration file, or the like is stored in a synchronous write mode to guarantee to complete the storing of data in the storage. Meanwhile, a conventional journaling file system (JFS) periodically commits a transaction for each transaction package with respect to a change of a system file. Thus, if a file stored in the synchronous write mode and a file stored in the asynchronous write mode are included in a single transaction, the updating of a file of the synchronous write mode should wait until the updating of a file of the asynchronous write mode is completed. Therefore, a response time is increased in a conventional method of storing data.

DISCLOSURE

Technical Problem

Aspects of the present disclosure are to address at least the above-mentioned problems and/or disadvantages and to provide at least the advantages described below. Accordingly, an aspect of the present disclosure is to provide a data operation method for independently or separately performing an input/output (I/O) in a synchronous write mode and an I/O in an asynchronous write mode and an electronic device therefor.

Technical Solution

In accordance with an aspect of the present disclosure, a data operation method is provided. The method may include assigning a reserved area of a memory of an electronic device to a file system of a RAMDisk associated with processing a data input/output (I/O) and controlling file processing of the file system of the RAMDisk.

In accordance with another aspect of the present disclosure, an electronic device is provided. The electronic device may include a memory configured to assign its reserved area to a file system of a RAMDisk associated with processing a data I/O and a data processing module configured to control file processing of the file system of the RAMDisk.

In accordance with another aspect of the present disclosure, a computer-readable storage media for storing instructions in the form of a programming module is provided. The instructions may be configured to assign a reserved area of a memory of an electronic device, which receives power associated with maintaining a data write state when supply of a main power is blocked to a file system of a RAMDisk associated with processing a data I/O and control file processing of the file system of the RAMDisk.

Advantageous Effects

According to various embodiments, an electronic device may optimize an I/O of a file in a synchronous write mode.

Also, according to various embodiments, the electronic device may minimize deterioration in a response time of an I/O in a synchronous write mode with high priority by a background processing I/O by separately or independently performing an I/O in a synchronous write mode and an I/O in an asynchronous write mode.

According to various embodiments, the electronic device may minimize a response time of a change in a user interface through a screen touch because an I/O of a file in the synchronous write mode is generated when a user interface is changed.

DESCRIPTION OF DRAWINGS

The above and other aspects, features, and advantages of certain embodiments of the present disclosure will be more apparent from the following description taken in conjunction with the accompanying drawings, in which.

BEST MODE

Mode for Invention

Figure 1:
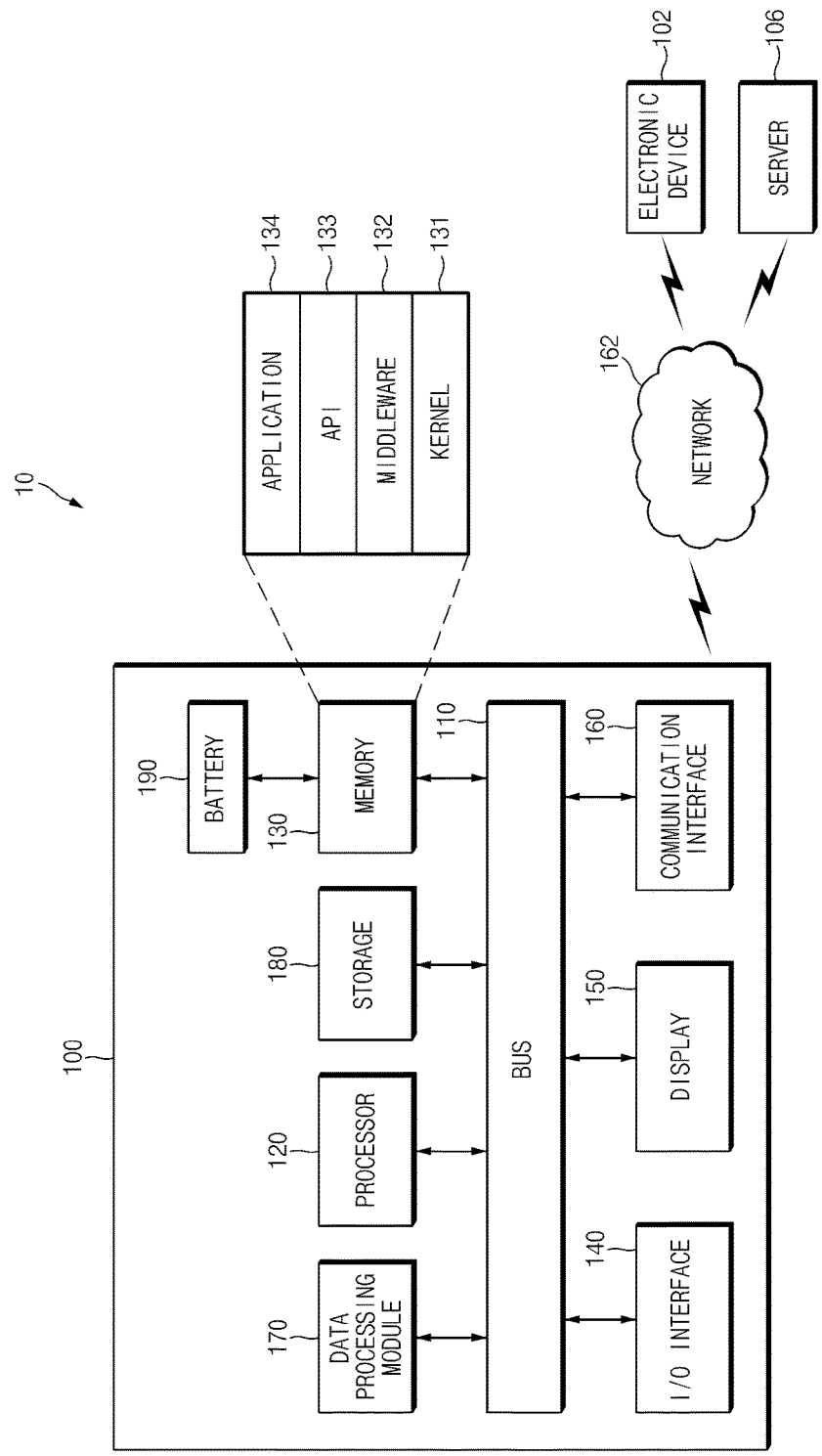
FIG. 1 is a block diagram illustrating an electronic device related system for operating data according to various embodiments.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a block diagram illustrating an electronic device related system for operating data according to various embodiments.

Referring to FIG. 1, according to an embodiment, a data operation system 10 may include an electronic device 100, an external electronic device 102, a server device 106, and a network 162.

In the above-mentioned data operation system 10, the network 162 may establish a communication channel between the electronic device 100 and the external electronic device 102. The network 162 may include, for example, network device elements associated with establishing a mobile communication channel. Alternatively, the network 162 may include network device elements associated with establishing an Internet communication channel. The network 162 may support to communicate data between the electronic device 100 and the external electronic device 102. Also, the network 162 may support to communicate data between the electronic device 100 and the server device 106.

The server device 106 may establish a communication channel with the electronic device 100 or the external electronic device 102 via the network 162. According to an embodiment, the server device 106 may provide data associated with operating a specific application of the electronic device 100. For example, the server device 106 may provide specific data (e.g., video data, game data, text data, and the like) to the electronic device 100, the external electronic device 102, or the like. Data provided to the electronic device 100 at the server device 106 may be stored in at least one of a memory 130 or a storage 180. According to an embodiment, specific data provided from the server device 106 may be temporarily stored in the memory 130. Alternatively, the specific data provided from the server device 106 may be stored in the storage 180. According to various embodiments, specific data (e.g., a large amount of data of a size or more) provided from the server device 106 may be temporarily stored in the memory 130 and may then be stored in the storage 180. Alternatively, the specified data provided from the server device 106 may be semipermanently stored in the memory 130. According to an embodiment, an input/output (I/O) or journaling of data operated in a synchronous write mode among data communicated between the server device 106 and the electronic device 100 may be performed through a specified area, for example, a RAMDisk, which receives power of a battery 190 of the memory 130. An I/O or journaling of data operated in an asynchronous write mode among data communicated between the server device 106 and the electronic device 100 may be performed based on the storage 180.

The external electronic device 102 may establish a communication channel with a communication interface 160 of the electronic device 100. For example, the external electronic device 102 may establish a short-distance communication channel, a wired communication channel with the communication interface 160. According to an embodiment, the external electronic device 102 may establish a Bluetooth (BT) communication channel, a wireless-fidelity (Wi-Fi) direct communication channel, or the like with the communication interface 160. Alternatively, the external electronic device 102 may establish a communication channel with the electronic device 100 over the network 162. For example, the external electronic device 102 may include a cellular communication module and may establish a mobile communication channel with the electronic device 100. Alternatively, the external electronic device 102 may include a Wi-Fi communication module and may establish a Wi-Fi communication channel with the electronic device 100. The external electronic device 102 may send scalable information to the electronic device 100.

According to various embodiments, the external electronic device 102 may send various data to the electronic device 100 over a communication channel established with the electronic device 100. For example, the external electronic device 102 may send chat message data, text message data, multimedia data, and the like to the electronic device 100. Alternatively, the external electronic device 102 may send a specific file (e.g., a large amount of data of a size or more, for example, a photo file, a text file, a video file, a music file, and the like) to the electronic device 100. An I/O or journaling of data processed in a synchronous write mode among data transmitted to the electronic device 100 may be performed based on the memory 130 of the electronic device 100. An I/O or journaling of data processed in an asynchronous write mode among the data transmitted to the electronic device 100 may be performed based on the storage 180 of the electronic device 100. Similar to the electronic device 100, the external electronic device 102 may perform an I/O and journaling of data processed in the synchronous write mode based on its memory and may perform an I/O and journaling of data processed in the asynchronous write mode based on its storage.

The electronic device 100 may establish a communication channel with at least one of the external electronic device 102 or the server device 106. The electronic device 100 may display a screen associated with another device which establishes a communication channel with the electronic device 100 on a display 150. The electronic device 100 may store data communicated with the server device 106, the external electronic device 102, or the like in at least one of the memory 130 or the storage 180. Also, the electronic device 100 may store data operated based on execution of a specific application in at least one of the memory 130 or the storage 180.

According to various embodiments, the electronic device 100 may perform an I/O or journaling of data processed in the synchronous write mode among operated data based on the memory 130. The electronic device 100 may perform an I/O or journaling of data processed in the asynchronous write mode based on the storage 180. The synchronous write mode may be a mode requested to process data in real time or perform a quick search simultaneously with updating a screen associated with executing an application. The asynchronous write mode may be a mode, such as a file download mode, of storing and selectively processing data.

Referring to FIG. 1, the electronic device 100 may include a bus 110, a processor 120, the memory 130, an I/O interface 140, a display 150, a communication interface 160, a data processing module 170, the storage 180, and the battery 190.

The bus 110 may be a circuit which connects the above-mentioned components with each other and performs communication (e.g., a control message, an input event, data, and the like) between the above-mentioned components. For example, the bus 110 may send an input signal, input from the I/O interface 140, to at least one of the processor 120 or the data processing module 170. Also, the bus 110 may send a control signal of the processor 120 or the data processing module 170 to the memory 130 or the storage 180. For example, the bus 110 may send data stored in the storage 180 to an area of the memory 130. Also, the bus 110 may send data stored in the memory 130 to the storage 180.

The processor 120 may receive a command from the above-mentioned other components (e.g., the memory 130, the I/O interface 140, the display 150, the communication interface 160, the data processing module 170, or the like) via the bus 110, may decode the received command, and may perform calculation or data processing according to the decoded command. Such processor 120 may be implemented in the form of including the data processing module 170 or in the form of being independent of the data processing module 170. The processor 120 may be implemented in the form of controlling the memory 130 and the storage 180 based on the bus 110 or directly. According to various embodiments, the processor 120 may operate a RAMDisk based on data attributes, may input and output data based on the RAMDisk, and may perform journaling based on the RAMDisk.

The memory 130 may store a command or data which is received from the processor 120 or another component (e.g., the I/O interface 140, the display 150, the communication interface 160, the data processing module 170, or the like)

or is generated by the processor 120 or the other component. The memory 130 may include, for example, a programming module, such as a kernel 131, a middleware 132, an application programming interface (API) 133, or at least one application 134. The above-mentioned programming module may be configured with software, firmware, hardware, or at least two of combinations thereof.

The kernel 131 may control or manage a system resource (e.g., the bus 110, the processor 120, the memory 130, the storage 180, the data processing module 170, or the like) used to execute an operation or function implemented in the other programming module, for example, the middleware 132, the API 133, or the application 134. Also, the kernel 131 may provide an interface which may access a separate component of the electronic device 100 in the middleware 132, the API 133, or the application 134 and may control or manage the separate component.

The middleware 132 may play a role as a go-between such that the API 133 or the application 134 communicates with the kernel 131 and transmits and receives data. Also, the middleware 132 may perform control (e.g., scheduling or load balancing) with respect to work requests using a method of assigning priority which may use a system resource (e.g., the bus 110, the processor 120, the memory 130, the storage 180, the data processing module 170, or the like) of the electronic device 100 to, for example, at least one of the at least one application 134, in connection with the work requests received from the at least one application 134.

The API 133 may be an interface in which the application 134 controls a function provided from the kernel 131 or the middleware 132. For example, the API 133 may include, for example, at least one interface or function (e.g., at least one command) for file control, window control, image processing, text control, or the like.

According to various embodiments, the at least one applications 134 may include a short message service/multimedia message service (SMS/MMS) application, an electronic mail (email) application, a calendar application, an alarm application, a health care application (e.g., an application for measuring quantity of exercise, blood sugar, or the like), an environment information application (e.g., an application for providing atmospheric pressure information, humidity information, temperature information, or the like), or the like. Additionally or alternatively, the application 134 may be an application associated with exchanging information between the electronic device 100 and an external electronic device (e.g., the external electronic device 102). The application associated with exchanging the information may include, for example, a notification relay application for transmitting specific information to the external electronic device or a device management application for managing the external electronic device.

For example, the notification relay application may include a function of transmitting notification information, which is generated by another application (e.g., the SMS/MMS application, the email application, the health care application, the environment information application, or the like) of the electronic device 100, to the external electronic device (e.g., the external electronic device 102). Additionally or alternatively, the notification relay application may receive notification information from, for example, the external electronic device (e.g., the external electronic device 102), and may provide the received notification information to a user of the electronic device 100. For example, the device management application may manage (e.g., install, delete, or update) a function (e.g., a function of turning on/off the external electronic device itself (or partial components) or a function of adjusting brightness (or resolution) of the display 150) for at least part of the external electronic device (e.g., the external electronic device 102) which communicates with the electronic device 100, an application which operates in the external electronic device, or a service (e.g., a call service or a message service) provided from the external electronic device. According to various embodiments, if the external electronic device is a motion picture experts group (MPEG-1 or MPEG-2) audio layer 3 (MP3) player, the application 134 may include an application associated with playing music. Similarly, if the external electronic device is a mobile medical device, the application 134 may include an application associated with health care.

According to an embodiment, data associated with the application 134 may be processed according to attributes or a type of the application 134 based on the memory 130 or the storage 180. For example, data associated with updating a screen or data (e.g., game data) requested to be applied in real time among data associated with the application 134 may be processed based on a RAMDisk arranged in the memory 130. Also, data (e.g., a large amount of data of a specified size or more, for example, a still image or a moving image) which is not requested to be applied in real time among data associated with the application 134 may be processed based on the storage 180. According to various embodiments, processing based on the memory 130 or processing based on the storage 180 may be set based on a type or attributes of the application 134, a type or attributes of a file, or the like. In this regard, the electronic device 100 may previously store configuration information (e.g., a configuration table) or may generate or update the configuration information by an operation of the user.

According to various embodiments, the memory 130 may include a control module for controlling to perform an I/O or journaling of data associated with the application 134 and an area which is allocated journaling file systems (JFSs). According to an embodiment, at least part of the entire area of the memory 130 may maintain data by receiving power from the battery 190. For example, if power-off (e.g., sudden power-off) occurs, a RAMDisk area in the entire area of the memory 130 may maintain a data write state based on power supplied from the battery 190.

The I/O interface 140 may transmit a command or data, input from the user via an I/O device (e.g., a sensor, a keyboard, or a touch screen) to, for example, the processor 120, the memory 130, the communication interface 160, or the data processing module 170 via the bus 110. Also, the I/O interface 140 may output, for example, a command or data, received from the processor 120, the memory 130, the communication interface 160, or the data processing module 170 via the bus 110, via the I/O device (e.g., a speaker or the display 150). According to various embodiments, the I/O interface 140 may include a physical key button (e.g., a home key, a side key, a power key, or the like), a jog key, a keypad, and the like. The I/O interface 140 may include a virtual keypad, output on the display module 140, as an input device. The I/O interface 140 may generate an input signal associated with executing at least one application, an input signal associated with requesting to supply power to the electronic device 100 which is powered off, and the like.

According to various embodiments, the I/O interface 140 may perform a function associated with processing an audio. In this regard, the I/O interface 140 may include at least one of a speaker or a microphone. The I/O interface 140 may output, for example, audio data associated with executing a specific application via the speaker under control of the data processing module 170.

The display 150 may display a variety of information (e.g., multimedia data, text data, or the like) to the user. For example, the display 150 may output a lock screen, an idle screen, and the like. The display 150 may output a screen of performing a specific screen, for example, a sound source playback screen, a video playback screen, a broadcast receive screen, and the like in response to performing a function. According to an embodiment, the display 150 may output a screen associated with a data processing scheme of an application. For example, the display 150 may output alarm information about whether specific data is stored in a RAMDisk of the memory 130 or the storage 180. The outputting of the alarm information may be omitted based on settings.

The communication interface 160 may establish communication between the electronic device 100 and an external device (e.g., at least one of the external electronic device 102 or the server device 106). For example, the communication interface 160 may connect to the network 162 through wireless communication or wired communication and may communicate with the external device. The wireless communication may include, for example, at least one of Wi-Fi communication, BT communication, near field communication (NFC) communication, global positioning system (GPS) communication, and cellular communication (e.g., long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like). The wired communication may include at least one of universal serial bus (USB) communication, high definition multimedia interface (HDMI) communication, recommended standard 232 (RS-232) communication, or plain old telephone service (POTS) communication.

According to an embodiment, the network 162 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 100 and the external device may be supported in at least one of the application 134, the API 133, the middleware 132, the kernel 131, or the communication interface 160.

If the electronic device 100 supports a plurality of communication modes, the communication interface 160 may include a plurality of communication modules. For example, the electronic device 100 may include a communication module, for example, a short-distance communication module or a direct communication module, for directly establishing a communication channel with the external electronic device 102. The short-distance communication module or the direct communication module may include at least one of various communication modules such as a Wi-Fi direct communication module, a BT communication module, and a Zigbee communication module. Also, the direct communication module may include a wired communication module such as a cable.

According to an embodiment, the communication interface 160 may receive specific data (e.g., an image file, a document file, a web page, and the like) from at least one of the external electronic device 102 or the server device 106. The received data may be temporarily stored in the memory 130 or may be stored in at least one of the memory 130 or the storage 180 based on settings. For example, the received data may be stored in the RAMDisk of the memory 130 or the storage 180 based on attributes or a type of the received data or attributes or a type of a related application.

The data processing module 170 may process data obtained from another component (e.g., the processor 120, the memory 130, the I/O interface 140, the communication interface 160, or the like). For example, the data processing module 170 may store data in the RAMDisk of the memory 130 or the storage 180 in response to attributes or a type of the corresponding data associated with a specific application.

The storage 180 may store data associated with operating the electronic device 100 and may send data to the memory 130 based on operation of the electronic device 100. The storage 180 may include, for example, a non-volatile storage area. The storage 180 may include a journaling file system (JFS) in connection with processing data stored in the memory 130. The JFS may support an operation of committing changed contents for each transaction if a file system is changed and applying a transaction change item to the file system after the committing of the changed contents is completed.

The battery 190 may supply power to at least part of the entire area of the memory 130. For example, if a main battery of the electronic device 100 is demounted from the electronic device 100, the battery 190 may support to supply power to the memory 130 and maintain a data write state. The battery 190 may be implemented with one of a primary battery or a secondary battery. If the battery 190 is implemented with the secondary battery, the battery 190 may be charged using power of the main battery in a state where the main battery is mounted on the electronic device 100.

Figure 2:
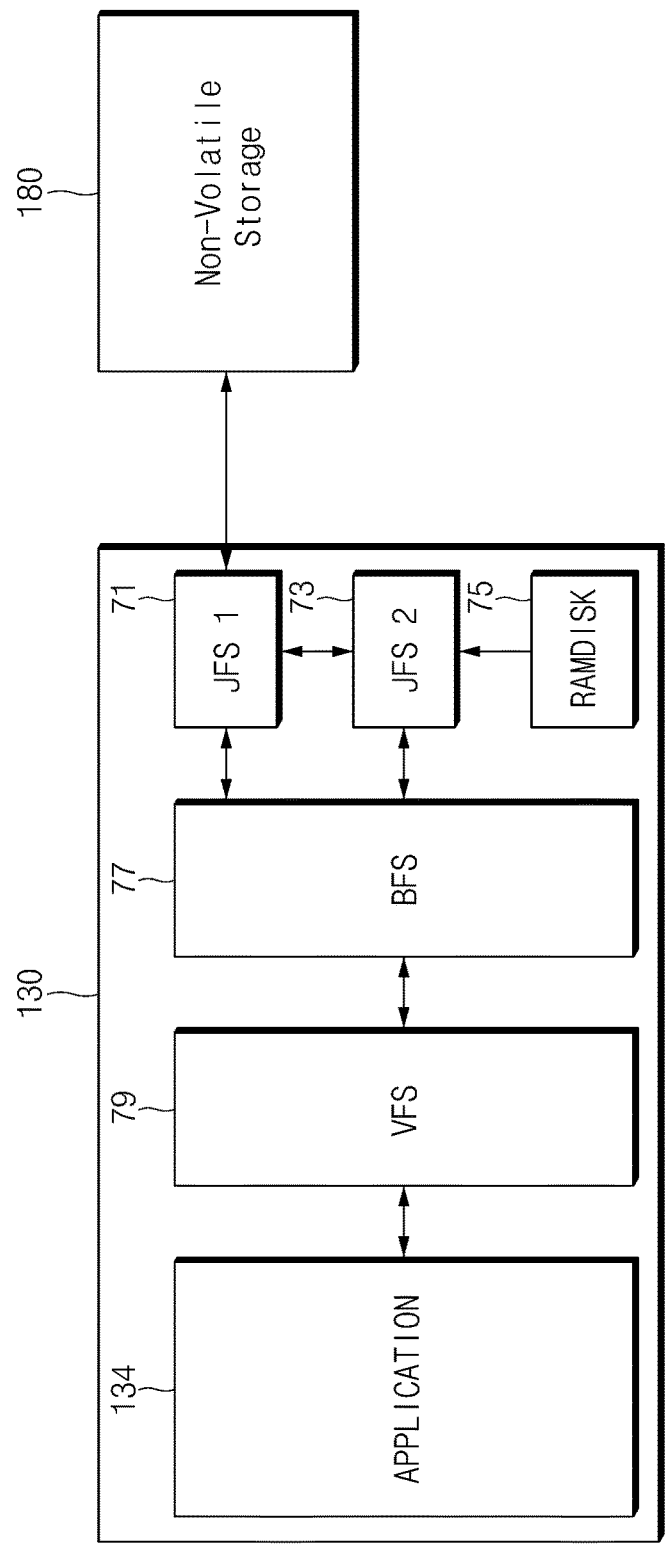
FIG. 2 is a block diagram illustrating an example of a memory and a storage of an electronic device according to various embodiments.

FIG. 2 is a block diagram illustrating an example of a memory and a storage of an electronic device according to various embodiments.

Referring to FIG. 2, a memory 130 may include an area of a first JFS JFS1 71, an area of a second JFS JFS2 73, an area of a RAMDisk 75, an area of an application 134, an area of a virtual file system (VFS) 79, and an area of a buffer file system (BFS) 77. At least one of the first JFS 71, the second JFS 73, the VFS 79, or the BFS 77 among the above-mentioned components may be configured with at least one of a software module, a middleware module, or a hardware module. For example, at least one of the first JFS 71, the second JFS 73, or the BFS 77 may be included in a data processing module 170 of FIG. 1 and may be allocated to a location independent of the memory 130.

According to various embodiments, at least one of the first JFS 71 or the second JFS 73 may be allocated to a storage 180 without being allocated to the memory 130. Also, the BFS 77 may be allocated to the storage 180. The VFS 79 may send a system call of the application 134 to the BFS 77 and may send the result of processing data in the BFS 77 to the application 134. In this operation, the VFS 79 may support a file system associated with operating the application 134 and may support a file system associated with operating the BFS 77. According to various embodiments, the first JFS 71 may be allocated to the memory 130 and may be used to move and store a file in the storage 180 in a transaction commit operation. The second JFS 73 may be allocated to the memory 130 and may be configured in connection with the RAMDisk 75 implemented based on a reserved region (or area) supported to receive power of the battery 190 or may be configured based on at least part of the RAMDisk 75. Data stored in the second JFS 73 may be moved and stored in the RAMDisk 75 or a reserved region (or area) in a transaction commit operation.

According to an embodiment, a data processing module 170 of FIG. 1 may allocate (or assign) the memory 130 including the VFS 79 and the BFS 77 in response to operating an electronic device 100 of FIG. 1. Also, if a request to execute the application 134 occurs, the data processing module 170 may allocate the application 134 to an area of the memory 130. The data processing module 170 may process data associated with the application 134 based on at least one of the first JFS 71 or the second JFS 73. Herein, the application 134 may be allocated to a plurality of memories. The data processing module 170 may control allocation of the BFS 77 to support processing according to attributes or a type of the application 134 (e.g., a synchronous write mode or an asynchronous write mode).

The above-mentioned electronic device 100 may improve database (DB) I/O performance on a file system using the RAMDisk 75 in a state where the battery 190 is allocated to the electronic device 100. The electronic device 100 may use a fixed address area reserved for the memory 130 (e.g., a reserved region or area) as a file system of the RAMDisk 75 associated with a file system associated with a synchronous write mode, for example, a DB I/O or an area associated with operating the RAMDisk 75. In case of the DB I/O, a file system synchronization operation may be performed in connection with supporting its own journaling mechanism. For example, when processing the DB I/O, the electronic device 100 may buffer a user file I/O to be dynamically independent of processing the DB I/O using the RAMDisk 75. If a main battery is detached from the electronic device 100, the battery 190 may supply its power to the memory 130 of the electronic device 100 during a time. Thus, when abnormal power-off (e.g., sudden power-off) occurs due to a system crash of the electronic device 100 or attachment/detachment of the main battery, the electronic device 100 may prevent data loss of the RAMDisk 75.

According to various embodiments, in connection with initializing a file system, the BFS 77 may determine the second JFS 73 corresponding to a file system superblock associated with the area of the RAMDisk 75 when the file system is mounted on the memory 130. If there is no the second JFS 73, the BFS 77 may assign a specified JFS to an area associated with the RAMDisk 75, may format a specified area to a JFS (e.g., an extended file system (ext4)), or may mount the corresponding JFS or a JFS (e.g., the second JFS 73).

According to an embodiment, the data processing module 170 may mount a specified JFS or the first JFS 71 on at least one of an area of the memory 130 or an area of the storage 180 in connection with processing data of the storage 180. The data processing module 170 may complete initialization of the BFS 77 which is an upper software stack. The application 134 allocated to the memory 130 based on a user request or in response to schedule information may set up a file type (extension name) or a file name to process a file I/O using the RAMDisk 75 through a system call such as I/O-control (e.g., input output control (ioctl)). In this operation, the set-up extension name or file name may be stored in the second JFS 73 of a file system or a hidden file area.

If a file open request for a specified file type (e.g., DB files: ".db", ".db-journal", "db-wal", ".shm") is received, the data processing module 170 may load a file from a first JFS of the storage 180 to the second JFS 73 or the RAMDisk 75 through a file copy and may process the file open request. Herein, if a space is insufficient to write data in the area of the RAMDisk 75 (e.g., if data associated with the application 134 is assigned to the entire area of the RAMDisk 75), the data processing module 170 may maintain a file list (e.g., a least recently used (LRU) file list) of the RAMDisk 75.

Upon an umount operation of a file system, a read-only remount operation of the file system, and a freeze (suspend) operation of the file system, the data processing module 170 may synchronize a file stored in the area of the RAMDisk 75 or a file stored in the second JFS 73 with a file stored in the first JFS 71 (or a JFS allocated to the storage 180). When the synchronization is completed, the data processing module 170 may display a recovery complete state on the area of the RAMDisk 75 or the area of the second JFS 73. In this regard, at least one of the area of the RAMDisk 75 or the area of the second JFS 73 may include a storage area (e.g., a bit area) associated with displaying the recovery complete state.

The data processing module 170 may use inode version information in connection with optimizing file synchronization performance. When loading a file into the area of the RAMDisk 75 (e.g., a RAMDisk partition), the data processing module 170 may increase an inode version value of the area of the first JFS 71 (e.g., inode version information of a file stored in the first JFS 71). When synchronizing a file of the second JFS 73 or the RAMDisk 75 with the first JFS 71, the data processing module 170 may scan the RAMDisk 75 or the second JFS 73. If an inode version value of the RAMDisk 75 or the second JFS 73 (e.g., inode version information of a file stored in the RAMDisk 75 or the second JFS 73) is greater than an inode version value of an original file stored in the first JFS 71, the data processing module 170 may perform a file copy. If the inode version value of the RAMDisk 75 or the second JFS 73 is identical to the inode version value of the original file stored in the first JFS 71, the data processing module 170 may fail to perform a file copy.

According to various embodiments, in connection with recover the RAMDisk 75 based on occurrence of abnormal power-off, the data processing module 170 may check a reserved area of the memory 130 and may recover the RAMDisk 75.

As described above, when separately or independently performing a synchronous write mode (e.g., a DB I/O) and an asynchronous write mode, the electronic device 100 may prevent deterioration in a response time of the synchronous write mode with high I/O priority in background processing. For example, the electronic device 100 may minimize a user interface lagging phenomenon by adaptively processing a DB I/O response time associated with storing an application program state when processing a user interface. Also, the electronic device 100 may optimize file I/O performance for a file frequently accessed by the application 134 or a file necessary for fast I/O processing.

As described above, according to various embodiments, an electronic device may include a memory configured to assign its reserved area to a RAMDisk file system associated with processing a data I/O and a data processing module configured to control file processing of the RAMDisk file system.

According to various embodiments, an electronic device may include a memory configured to comprise an area of at least one file system and a data processing module configured to connect with the memory, wherein the data processing module assigns a reserved area of the memory to a file system of a RAMDisk associated with processing a data input/output (I/O) and controls file processing of the file system of the RAMDisk.

According to various embodiments, the electronic device may further comprise a battery configured to supply power associated with maintaining a data write state of the memory when supply of a main power is blocked.

According to various embodiments, the data processing module may replace the file system of the RAMDisk based on a high speed storage.

According to various embodiments, the data processing module may format an area of the RAMDisk or a memory area associated with the RAMDisk to a journaling file system (JFS) and mounts the JFS.

According to various embodiments, the memory may comprise at least one of an area of at least one application configured to set up a file type or a file name to process a file I/O using the RAMDisk through a system call, an area of a virtual file system (VFS) configured to support to process a file associated with operating the application, an area of a buffer file system (BFS) configured to control file processing according to a synchronous write mode and file processing according to an asynchronous write mode based on a command or attributes of a file sent via the VFS and an area of the file system of the RAMDisk configured to process a file requested to be processed in the synchronous write mode under the control of the BFS.

According to various embodiments, the electronic device may further comprise a storage configured to support to process the file requested to be processed in the asynchronous write mode.

According to various embodiments, the data processing module may copy a file from a JFS of a storage to the RAMDisk and processes the file if a file open request for a file type is received and checks the reserved area of the memory and recovers the RAMDisk if a rebooting process is performed after abnormal end.

According to various embodiments, the data processing module may check (or verify) the remaining space of the RAMDisk when a new file is loaded into the RAMDisk, removes a file from the RAMDisk based on a list associated with data written in the RAMDisk, and move and store the file in a storage.

According to various embodiments, the data processing module may move and stores files registered in the list in an order of closed and the oldest unused files.

According to various embodiments, the data processing module may perform at least one of controlling a state display associated with completing synchronization of a file of the RAMDisk with a storage based on occurrence of an event or determining whether file synchronization is performed based on the result of comparing a version value of a file stored in the RAMDisk with a version value of a file stored in the storage.

Figure 3:
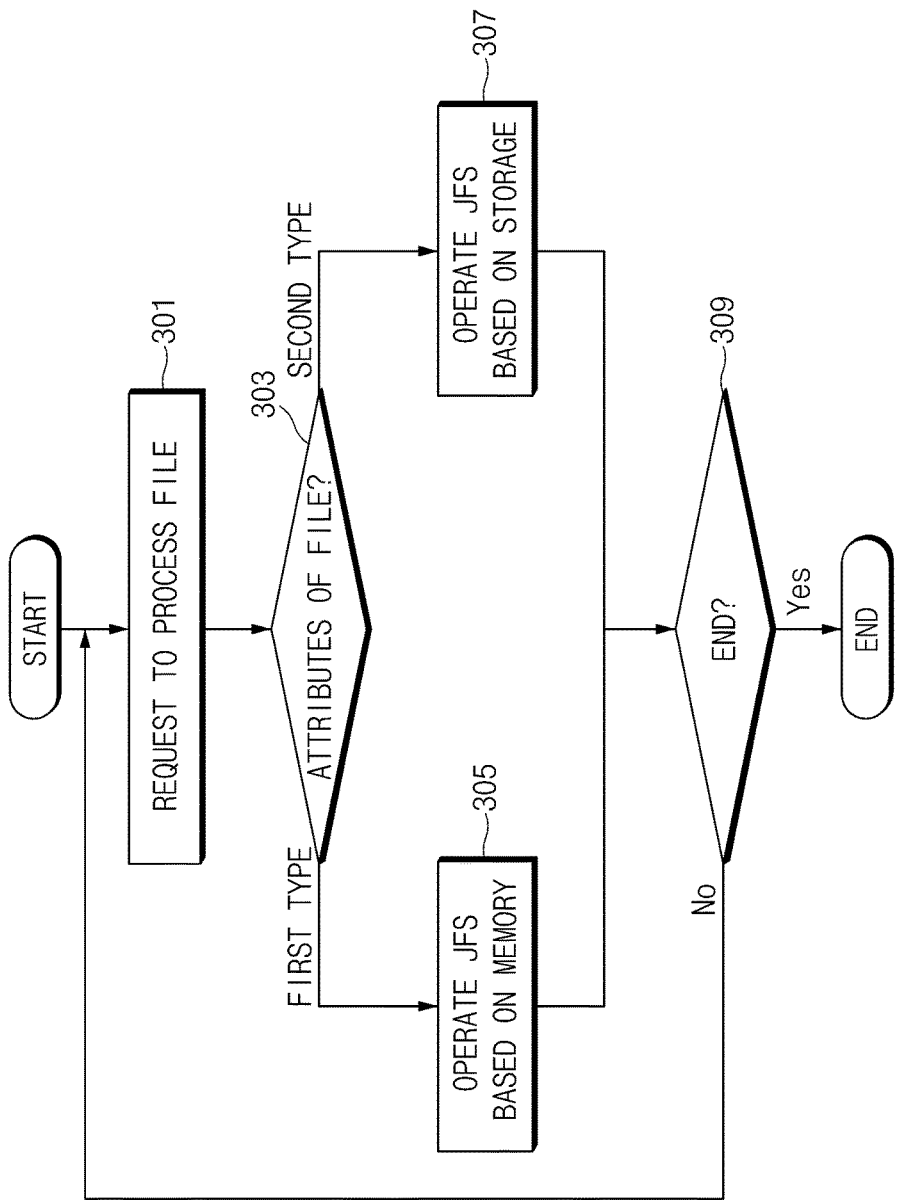
FIG. 3 is a flowchart illustrating a data operation method according to various embodiments.

FIG. 3 is a flowchart illustrating a data operation method according to various embodiments.

Referring to FIG. 3, in connection with the data operation method, in operation 301, a data processing module 170 of FIG. 1 may receive a request to process a file. For example, the data processing module 170 may execute a specific application by an input event generated via an I/O interface 140 of FIG. 1. In this operation, the data processing module 170 may receive a request to process data (e.g., a file) associated with executing the application. Alternatively, the data processing module 170 may receive a request to process data from the outside via a communication interface 160 of FIG. 1. Alternatively, the data processing module 170 may receive a request to process specific data based on operation of the electronic device 100 (e.g., processing according to schedule information).

The data processing module 170 may perform an initialization process in connection with processing data. In the initialization process, the data processing module 170 may mount a BFS 77 of FIG. 2 on a memory 130 of FIG. 1. In this operation, the data processing module 170 may determine whether there is a file system superblock (e.g., a second JFS 73 of FIG. 2) of an area of a RAMDisk 75 of FIG. 2. If there is no the file system superblock, the data processing module 170 may format an area associated with the area of the RAMDisk 75 to a specified JFS (e.g., an ext4) and may mount the BFS 77. Also, the data processing module 170 may mount a storage 180 of FIG. 2 on an area of a first JFS 71 of FIG. 2 and may complete initialization of the BFS 77 which is an upper software stack. Herein, the data processing module 170 may mount the first JFS 71 on an area of the memory 130.

In operation 301, an application 134 of FIG. 2 may set up a file type (extension name) or a file name to process a file I/O using the area of the RAMDisk 75 through a system call (e.g., ioctl). Also, the extension name or the file name set up by the application 134 may be stored in the second JFS 73 of a file system or a hidden file area.

In operation 303, the data processing module 170 may verify attributes of the file requested to be processed. For example, the data processing module 170 may determine whether the file processed to be processed has a first type (e.g., processing a data I/O or a file necessary for processing in a synchronous write mode) or a second type (e.g., processing a data I/O or a file necessary for processing in an asynchronous write mode). If the attributes of the file has the first type in operation 303, in operation 305, the data processing module 170 may operate a JFS based on the memory 130. For example, the data processing module 170 may process data of the synchronous write mode based on the RAMDisk 75 or the second JFS 73 of the memory 130. If the attributes of the file has the second type in operation 303, in operation 307, the data processing module 170 may operate a JFS based on the storage 180. For example, the data processing module 170 may store data in the storage 180 based on the first JFS 71 allocated to the memory 130 (e.g., process data based on the asynchronous write mode). Alternatively, the data processing module 170 may process data according to the asynchronous write mode based on a first JFS allocated to the storage 180. According to an embodiment, if a file open request for a specified file type (e.g., DB files: ".db", ".db-journal", "db-wal", ".shm") is generated, the data processing module 170 may load a file from the first JFS of the storage 180 to the RAMDisk 75 or a related second JFS through a file copy and may process the file open request.

If the data processing in operation 305 or the data processing in operation 307 is completed, in operation 309, the data processing module 170 may determine whether an end event associated with the request to process the file is generated. If the end event is generated (e.g., if the electronic device 100 is turned off or if the electronic device 100 is changed to a sleep mode), the data processing module 170 may control corresponding state transition. If the end event is not generated, the data processing module 170 may branch to operation 301 to perform the operation again from operation 301.

As described above, the data processing module 170 of the electronic device 100 according to various embodiments may operate a fixed address area reserved for the memory 130 (e.g., a reserved area) in the synchronous write mode (e.g., a RAMDisk file system for a DB I/O) in a device which mounts a battery (e.g., a backup battery) or may use the fixed address area as an area for setting or recovering the RAMDisk 75.

Figure 4:
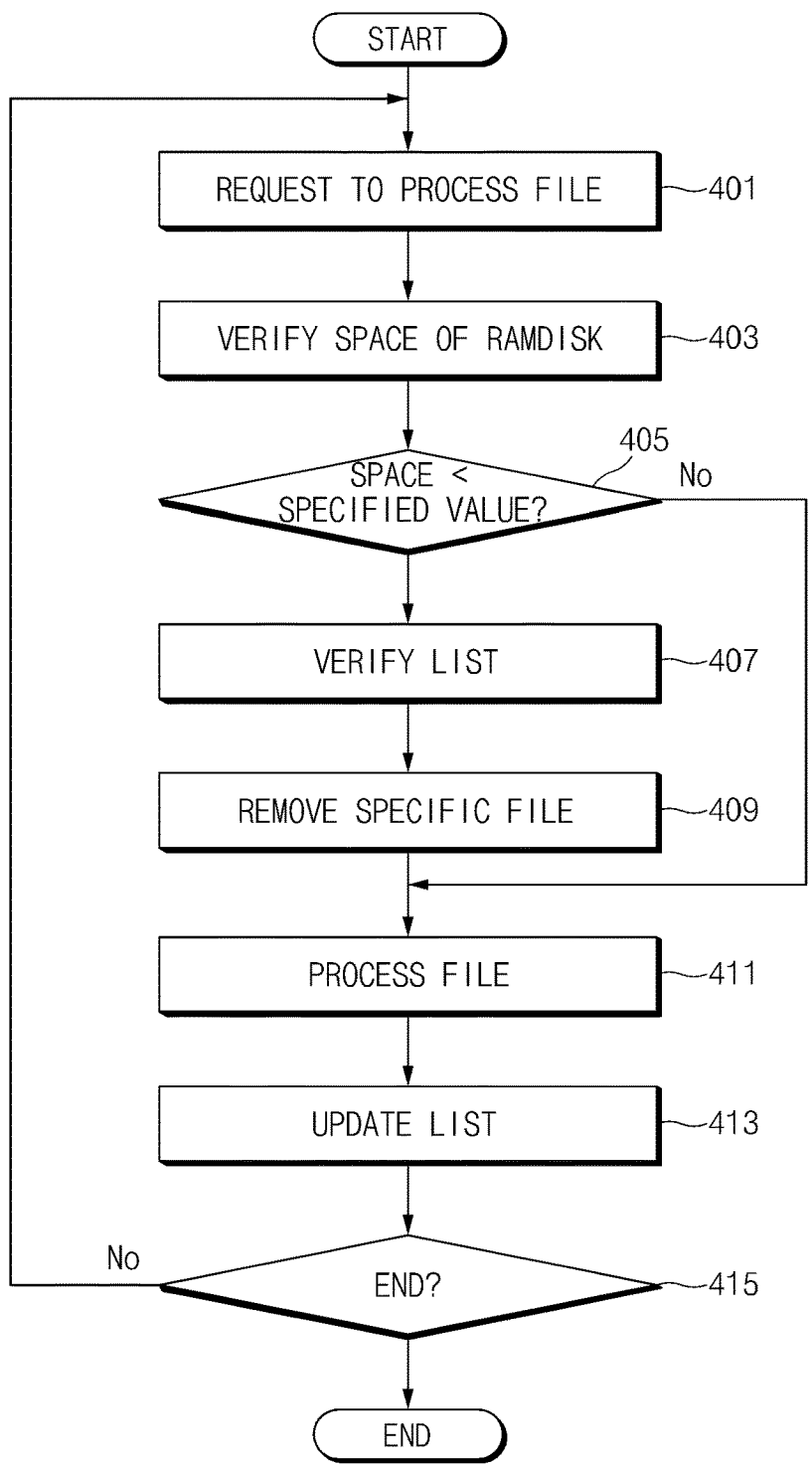
FIG. 4 is a flowchart illustrating a RAMDisk operation method according to various embodiments.

FIG. 4 is a flowchart illustrating a RAMDisk operation method according to various embodiments.

Referring to FIG. 4, in connection with the RAMDisk operation method, in operation 401, a data processing module 170 of FIG. 1 may receive, for example, a request to process a file. In connection with receiving the request to process the file, as described above, the data processing module 170 may allocate a RAMDisk 75 of FIG. 2 while initializing a memory 130 of FIG. 2. Also, the data processing module 170 may allocate an application 134 of FIG. 2 to the memory 130 in response to schedule information or a user input. If it is necessary for processing data associated with operation, the application 134 may request a BFS 77 of FIG. 2 to send a system call via a VFS 79 of FIG. 2.

If the request to process the file is received, in operation 403, the data processing module 170 may verify, for example, a space of the RAMDisk 75. For example, the data processing module 170 may verify a location and size of an area of the RAMDisk 75, defined using a reserved area of the memory 130. The data processing module 170 may verify a size and location of an area in which data is not written in the entire area of the RAMDisk 75.

In operation 405, the data processing module 170 may determine, for example, whether the remaining space of the RAMDisk 75 is less than or equal to a specified value. For example, the data processing module 170 may compare a size value of data requested to process the file with a size of the remaining space of the RAMDisk 75.

If the remaining space of the RAMDisk 75 is less than or equal to the specified value in operation 405 (e.g., if the remaining space of the RAMDisk 75 is smaller than a size of the data requested to process the file), in operation 407, the data processing module 170 may verify a list (e.g., an LRU file list). In this regard, the data processing module 170 may generate and manage a file list in an operation of writing data in the RAMDisk 75.

In operation 409, the data processing module 170 may remove (or evict) a specific file. The removed file may be stored in a first JFS 71 or a storage 180 of FIG. 2. According to an embodiment, the data processing module 170 may remove a specific file, for example, the oldest file which is not accessed by an application 134 of FIG. 2 (or a file in which a time which is not accessed passes a specified period of time) among files included in the list. After removing the file, the data processing module 170 may compare the remaining space of the RAMDisk 75 with a size of the data requested to process the file (e.g., determine whether the size of the data requested to process the file is relatively smaller than the remaining space of the RAMDisk 75). If the remaining space of the RAMDisk 75 is smaller than the size of the data requested to process the file, the data processing module 170 may verify the list and may remove another specific file (e.g., a file with the oldest time which is not accessed by the electronic device 100). Until the remaining space of the RAMDisk 75 has a size for processing the data requested to process the file, the data processing module 170 may repeatedly perform the above-mentioned operations.

According to various embodiments, the data processing module 170 may verify the size of the data requested to process the file and may collectively remove the file such that the remaining space of the RAMDisk 75 is greater than or equal to the size of the data requested to process the file. For example, the data processing module 170 may verify the remaining space of the RAMDisk 75 and the size of the data requested to process the file to verify a necessary space. The data processing module 170 may select and remove at least one file corresponding to a size of the necessary space. In this operation, the data processing module 170 may remove files corresponding to the necessary space in an order of the oldest unused files.

According to an embodiment, the data processing module 170 may select and remove a file of a size corresponding to processing the file except for the remaining space of the RAMDisk 75 among the oldest files. According to various embodiments, the data processing module 170 may remove a file among data of a file closed state. After removing the data of the file closed state stored in the RAMDisk 75, if a space of the RAMDisk 75 is insufficient, the data processing module 170 may remove the oldest unused file among data of a file open state. In this operation, the data processing module 170 may output an alarm associated with removing an open file via at least one of a display 150 or an I/O interface 140 of FIG. 1. Alternatively, the data processing module 170 may output a pop-up window of inquiring whether to remove an open file in connection with processing a new file.

If the remaining space of the RAMDisk 75 is greater than or equal to the specified value in operation 405, the data processing module 170 may omit operations 407 and 409. If a specified file is removed (if the remaining space of the RAMDisk 75 is greater than or equal to the size of the data requested to process the file) in operation 409, in operation 411, the data processing module 170 may process the file based on the request to process the file. For example, the BFS 77 may configure a specified type file system (e.g., an ext4) in each of the RAMDisk 75 and the storage 180 and may dynamically load the data requested to process the file into a second JFS of the RAMDisk 75 to process a file I/O.

If the processing of the file is completed, in operation 413, the data processing module 170 may update the list. For example, the data processing module 170 may register a data item requested to process a new file in the list. In operation 415, the data processing module 170 may determine, for example, whether an end event associated with processing the file is generated. If the end event associated with processing the file is not generated, the data processing module 170 may branch to operation 401 to perform the operation again from operation 401 using the updated list.

Figure 5:
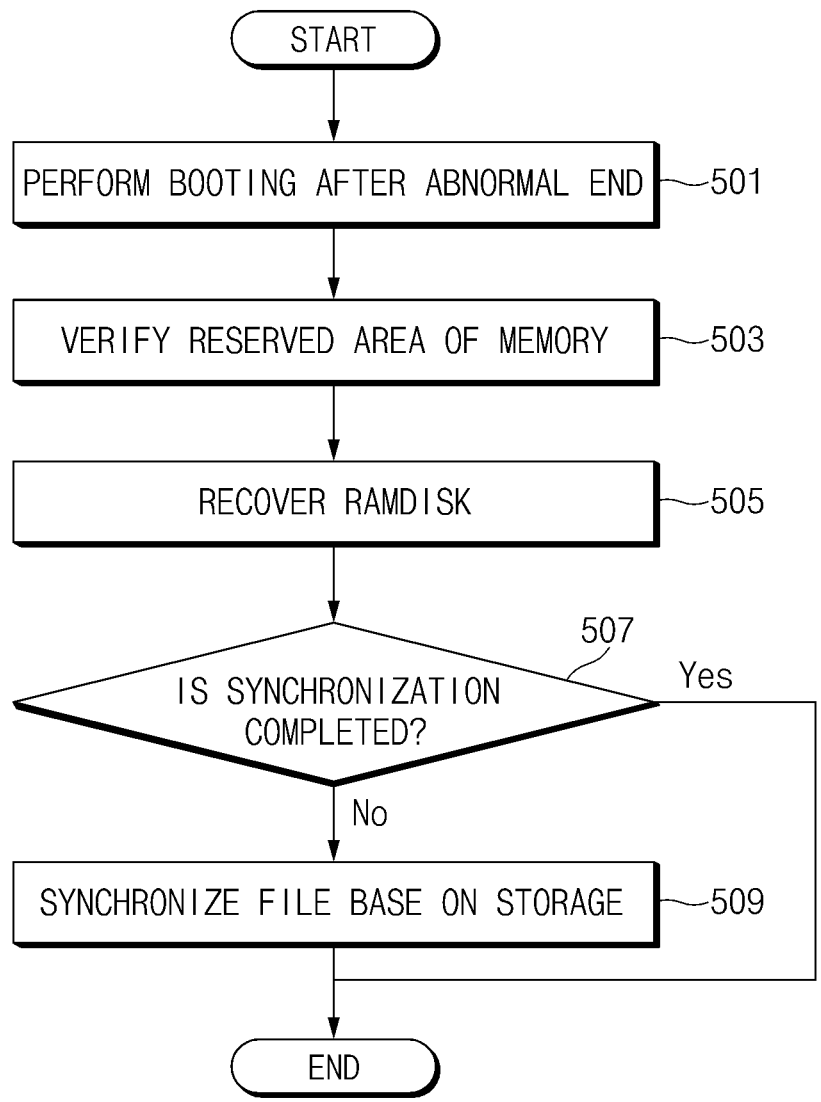
FIG. 5 is a flowchart illustrating a file system recovery method according to various embodiments.

FIG. 5 is a flowchart illustrating a file system recovery method according to various embodiments.

Referring to FIG. 5, in connection with the file system recovery method, in operation 501, a data processing module 170 of FIG. 1 may perform at least one processing associated with performing a booting process after an abnormal end (e.g., load a boot loader, load an operating system (OS), processing associated with operating an electronic device 100, and the like). While operating the booting process, in operation 503, the data processing module 170 may verify a reserved area of a memory 130 of FIG. 2. For example, the data processing module 170 may set a size of a RAMDisk 75 of FIG. 2 which is being driven using a battery 190 of FIG. 1 based on the reserved area in consideration of I/O performance of a storage 180 of FIG. 2 and capacity of the battery 190.

If the reserved area is verified, in operation 505, the data processing module 170 may recover, for example, the RAMDisk 75. According to an embodiment, the data processing module 170 may check a file system superblock (e.g., a second JFS) of the RAMDisk 75, initialized through the reserved area of the memory 130 while the BFS 77 is mounted in the booting process. If there is the file system superblock and if it is not in a recovery complete state, the data processing module 170 may synchronize a file of the RAMDisk 75 with a first JFS 71 of FIG. 2.

In operation 507, the data processing module 170 may determine, for example, whether the synchronization is completed. If the synchronization is not completed in operation 507, in operation 509, the data processing module 170 may perform file synchronization based on the storage 180. If the synchronization is completed in operation 507, the data processing module 170 may skip operation 509. If synchronization of files stored in an area of the RAMDisk 75 is completed (e.g., if copy and store the file stored in the area of the RAMDisk 75 in the storage 180 or the first JFS 71), the data processing module 170 may perform an operation of mounting a BFS 77 of FIG. 2.

As described above, if the electronic device 100 including the battery 190 is designed to support a system maintenance operation when a main battery is detached from the electronic device 100, the data processing module 170 may synchronize the RAMDisk 75 or the second JFS 73 with the storage 180 or the first JFS 71 through a file system freeze operation. When the synchronization is completed, the data processing module 170 may display a recovery complete state on a second JFS of the RAMDisk 75.

According to various embodiments, upon an umount operation of a file system, a read-only remount operation of the file system, and a freeze (suspend) operation of the file system, the data processing module 170 may synchronize a file of the RAMDisk 75 or the second JFS 73 with the first JFS 71. When the synchronization is completed, the data processing module 170 may display a recovery complete state on an area of the RAMDisk 75 or an area of the second JFS 73. In the above-mentioned operation, the data processing module 170 may use inode version information for optimizing file synchronization performance.

According to various embodiments, a data operation method may be provided. The method may comprise assigning a reserved area of a memory of an electronic device to a file system of a RAMDisk associated with processing a data input/output (I/O) and controlling file processing of the file system of the RAMDisk.

According to various embodiments, the controlling of the file processing of the file system of the RAMDisk may comprise replacing the file system of the RAMDisk based on a high speed storage.

According to various embodiments, the method may further comprise at least one of formatting an area of the RAMDisk or a memory area associated with the RAMDisk to a journaling file system (JFS) and mounting the JFS, setting up, by an application allocated to the memory, a file type or a file name to process a file I/O using the RAMDisk through a system call, allocating a virtual file system (VFS) configured to support to process a file associated with operating the application to the memory and allocating a buffer file system (BFS) configured to control file processing according to a synchronous write mode and file processing according to an asynchronous write mode based on a command or attributes of a file sent via the VFS to the memory.

According to various embodiments, the method may further comprise sending the file requested to be processed in the asynchronous write mode to a storage.

According to various embodiments, the method may further comprise verifying (or identifying) the remaining space of the RAMDisk when a new file is loaded into the RAMDisk, removing a file from the RAMDisk based on a list associated with data written in the RAMDisk and moving and store the file in a storage and processing the new file based on an area obtained based on the removal of the file.

According to various embodiments, the moving and storing of the file may comprise moving and storing files registered in the list in an order of closed and the oldest unused files.

According to various embodiments, the method may further comprise synchronizing a file of the RAMDisk with a storage when an event occurs and performing a state display associated with completing the synchronizing of the file of the RAMDisk.

According to various embodiments, the synchronizing of the file of the RAMDisk may comprise determining whether file synchronization is performed based on the result of comparing a version value of a file stored in the RAMDisk with a version value of a file stored in the storage.

According to various embodiments, the method may further comprise copying a file from a JFS of a storage to the RAMDisk and processes the file, if a file open request for a file type is received, checking the reserved area of the memory in a rebooting process after abnormal end and maintaining a data write state of the memory using a battery power when supply of a main power is blocked.

According to various embodiments, controlling may include replacing a RAMDisk file system based on a high speed storage.

Figure 6:
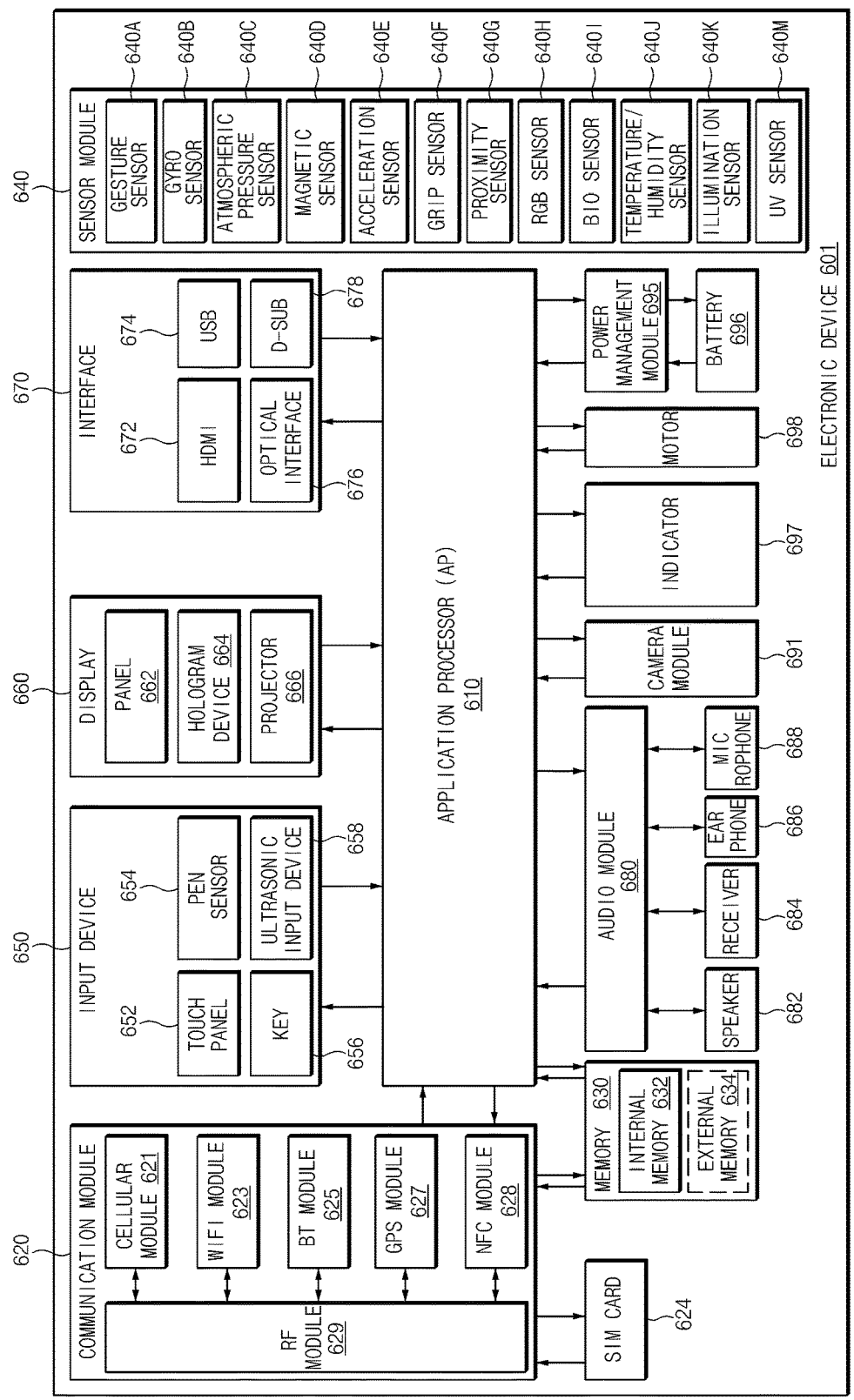
FIG. 6 is a block diagram illustrating a configuration of an electronic device according to various embodiments.

FIG. 6 is a block diagram illustrating a configuration of an electronic device according to various embodiments.

Referring to FIG. 6, an electronic device 601 may include, for example, all or part of an electronic device 100 shown in FIG. 1. Referring to FIG. 6, the electronic device 601 may include one or more application processors (APs) 610 (e.g., a processor 120, a data processing module 170, and the like of FIG. 1), a communication module 620 (e.g., a communication interface 160 of FIG. 1), a subscriber identification module (SIM) card 624, a memory 630 (e.g., a memory 130 and a storage 180 of FIG. 1), a sensor module 640, an input device 650 (e.g., an I/O interface 140 of FIG. 1), a display 660 (e.g., a display 150 of FIG. 1), an interface 670, an audio module 680 (e.g., the I/O interface 140), a camera module 691, a power management module 695, a battery 696, an indicator 697, and a motor 698.

The AP 610 may drive an operating system (OS) or an application program to control a plurality of hardware or software components connected thereto and may process and compute a variety of data including multimedia data. The AP 610 may be implemented with, for example, a system on chip (SoC). According to an embodiment, the AP 1510 may include a graphic processing unit (GPU) (not shown).

The communication module 620 (e.g., the communication interface 160) may transmit and receive data in communication between the electronic device 601 (e.g., the electronic device 100) and another electronic device (e.g., an external electronic device 102 or a server device 106 of FIG. 1) connected with the electronic device 601 over a network. According to an embodiment, the communication module 620 may include the cellular module 621, a wireless-fidelity (Wi-Fi) module 623, a Bluetooth (BT) module 625, a global positioning system (GPS) module 627, a near field communication (NFC) module 628, and a radio frequency (RF) module 629.

The cellular module 621 may provide a voice call service, a video call service, a text message service, or an Internet service, and the like over a communication network (long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like). Also, the cellular module 621 may identify and authenticate, for example, the electronic device 601 in a communication network using a SIM (e.g., the SIM card 624). According to an embodiment, the cellular module 621 may perform at least some of functions which may be provided by the AP 610. For example, the cellular module 621 may perform at least part of a multimedia control function.

According to an embodiment, the cellular module 621 may include a communication processor (CP). Also, the cellular module 621 may be implemented with, for example, a system on chip (SoC). In FIG. 6, an embodiment is exemplified as a component such as the cellular module 621 (e.g., the CP), the memory 630, the power management module 695, or the like is independent of the AP 610. However, according to an embodiment, the AP 610 may be implemented to include at least some (e.g., the cellular module 621) of the above-mentioned components.

According to an embodiment, the AP 610 or the cellular module 621 (e.g., the CP) may load a volatile memory (e.g., a memory 130 of FIG. 1) with a command or data received from at least one of a non-volatile memory (e.g., a storage 180 of FIG. 1) or another component connected thereto to process the command or data. Also, the AP 610 or the cellular module 621 may store data, received from at least one of other components or generated by at least one of the other components, in a non-volatile memory (e.g., the storage 180).

The Wi-Fi module 623, the BT module 625, the GPS module 627, or the NFC module 628 may include, for example, a processor for processing data transmitted and received via the corresponding module. In FIG. 6, an embodiment is exemplified as the cellular module 621, the Wi-Fi module 623, the BT module 625, the GPS module 627, or the NFC module 628 is independent of each other. However, according to an embodiment, at least some (e.g., two or more) of the cellular module 621, the Wi-Fi module 623, the BT module 625, the GPS module 627, or the NFC module 628 may be included in one integrated chip (IC) or one IC package. For example, at least some of (e.g., a CP corresponding to the cellular module 621 and a Wi-Fi processor corresponding to the Wi-Fi module 623) of processors corresponding to the cellular module 621, the Wi-Fi module 623, the BT module 625, the GPS module 627, or the NFC module 628 may be implemented with one SoC.

The RF module 629 may transmit and receive data, for example, a radio frequency (RF) signal. Though not shown, the RF module 629 may include, for example, a transceiver, a power amplifier module (PAM), a frequency filter, or a low noise amplifier (LNA), and the like. Also, the RF module 629 may further include a component, for example, a conductor or a conducting wire, for transmitting and receiving electromagnetic waves on free space in wireless communication. In FIG. 6, an embodiment is exemplified as the cellular module 621, the Wi-Fi module 623, the BT module 625, the GPS module 627, or the NFC module 628 shares the one RF module 1529 with each other. However, according to an embodiment, at least one of the cellular module 621, the Wi-Fi module 623, the BT module 625, the GPS module 627, or the NFC module 628 may transmit and receive an RF signal via a separate RF module.

The SIM card 624 may include, for example, a card which includes a SIM and may be inserted into a slot formed in a specific location of the electronic device 601. The SIM card 624 may include unique identification information (e.g., an integrated circuit card identifier (ICCID)) or subscriber information (e.g., an international mobile subscriber identity (IMSI)).

The memory 630 (e.g., the memory 130) may include, for example, an embedded memory 632 or an external memory 634. The embedded memory 632 may include at least one of, for example, a volatile memory (e.g., the memory 130) (e.g., a dynamic random access memory (DRAM), a static RAM (SRAM), a synchronous dynamic RAM (SDRAM), and the like), or a non-volatile memory (e.g., the storage 180) (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment, the embedded memory 632 may be a solid state drive (SSD). The external memory 634 may include a flash drive, for example, a compact flash (CF), a secure digital (SD), a micro-SD, a mini-SD, an extreme digital (xD), a memory stick, or the like. The external memory 634 may operatively connect with the electronic device 601 via various interfaces. According to an embodiment, the electronic device 601 may further include a storage device (or a storage medium) such as a hard drive.

According to various embodiments, at least a partial area (e.g., a reserved area) implemented with a volatile memory in the memory 630 may maintain a data write state by power supplied from a battery 190 of FIG. 1. Thus, the memory 630 may provide an area of a RAMDisk 75 of FIG. 2, defined based on the reserved area in connection with an I/O or journaling of a file requested to be processed based on a synchronous write mode. The memory 630 may provide a non-volatile memory (e.g., the storage 180) in connection with an I/O or journaling of a file requested to be processed based on an asynchronous write mode.

The sensor module 640 may measure a physical quantity or may detect an operation state of the electronic device 601, and may convert the measured or detected information to an electric signal. The sensor module 640 may include at least one of, for example, a gesture sensor 640A, a gyro sensor 640B, a barometric pressure sensor 640C, a magnetic sensor 640D, an acceleration sensor 640E, a grip sensor 640F, a proximity sensor 640G, a color sensor 640H (e.g., red, green, blue (RGB) sensor), a biometric sensor 640I, a temperature/humidity sensor 640J, an illumination sensor 640K, or an ultraviolet (UV) sensor 640M. Additionally or alternatively, the sensor module 640 may include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), a fingerprint sensor (not shown), or the like. The sensor module 640 may further include a control circuit for controlling at least one or more sensors included therein.

The input device 650 may include a touch panel 652, a (digital) pen sensor 654, a key 656, or an ultrasonic input unit 658. The touch panel 652 may recognize, for example, a touch input using at least one of a capacitive type, a resistive type, an infrared type, or an ultrasonic type. Also, the touch panel 652 may include a control circuit. In case of the capacitive type, the touch panel 652 may recognize a physical contact or may perform proximity recognition. The touch panel 652 may further include a tactile layer. In this case, the touch panel 652 may provide a tactile reaction to a user.

The (digital) pen sensor 654 may be implemented using the same or similar method to a method of receiving a touch input of the user or a separate sheet for recognition. The key 656 may include, for example, a physical button, an optical key, or a keypad. The ultrasonic input unit 658 may allow the electronic device 601 to detect a sound wave using a microphone (e.g., a microphone 688) and to verify data through an input tool which generates an ultrasonic signal, and may perform wireless recognition. According to an embodiment, the electronic device 601 may receive a user input from an external device (e.g., a computer or a server) connected with the communication module 620, using the communication module 620.

According to various embodiments, the input device 650 may support to generate an event on a first display region. For example, the input device 650 may support to generate a touch event, a hovering event, and the like associated with a scroll operation of the first display region.

The display 660 (e.g., the display module 150) may include a panel 662, a hologram device 664, or a projector 666. The panel 662 may be, for example, a liquid-crystal display (LCD), an active-matrix organic light-emitting diode (AM-OLED), and the like. The panel 662 may be implemented to be, for example, flexible, transparent, or wearable. The panel 662 and the touch panel 652 may be integrated into one module. The hologram device 664 may show a stereoscopic image in a space using interference of light. The projector 666 may project light onto a screen to display an image. The screen may be positioned, for example, inside or outside the electronic device 601. According to an embodiment, the display 660 may further include a control circuit for controlling the panel 662, the hologram device 664, or the projector 666.

The display 660 may distinctively display data stored in the RAMDisk 75 from data stored in the storage 180. Also, the display 660 may provide a URL file list in connection with managing the RAMDisk 75 and may support to remove (or evict) a file selected by the user from a list when a new file is loaded.

The interface 670 may include, for example, a high-definition multimedia interface (HDMI) 672, a universal serial bus (USB) 674, an optical interface 676, or a D-sub-miniature 678. The interface 670 may be included in, for example, the communication interface 160 shown in FIG. 1. Additionally or alternatively, the interface 670 may include, for example, a mobile high definition link (MEL) interface, an SD card/multimedia card (MMC) interface, or an infrared data association (IrDA) standard interface.

The audio module 680 may interchangeably convert a sound into an electric signal. The audio module 680 may be included in, for example, the I/O interface 140 shown in FIG. 1. The audio module 680 may process sound information input or output through, for example, a speaker 682, a receiver 684, an earphone 686, the microphone 688, or the like.

The camera module 691 may be a device which captures a still image and a moving image. According to an embodiment, the camera module 691 may include one or more image sensors (not shown) (e.g., a front sensor or a rear sensor), a lens (not shown), an image signal processor (ISP) (not shown), or a flash (not shown) (e.g., an LED or a xenon lamp).

The power management module 695 may manage power of the electronic device 601. Though not shown, the power management module 695 may include a power management integrated circuit (PMIC), a charger IC or a battery or fuel gauge. If power supply is stopped due to detachment of a main battery, the power management module 695 may supply power of the battery 190 to the memory 130 or the reserved area of the memory 130.

The PMIC may be mounted on, for example, an integrated circuit (IC) or a system on chip (SoC). A charging method may be classified into a wired charging method and a wireless charging method. The charger IC may charge the battery 696 and may prevent overvoltage or overcurrent from flowing from a charger. According to an embodiment, the charger IC may include a charger IC for at least one of the wired charging method or the wireless charging method. The wireless charging method may include, for example, a magnetic resonance method, a magnetic induction method, an electromagnetic method, or the like. An additional circuit for wireless charging, for example, a coil loop, a resonance circuit, a rectifier, or the like may be further provided.

The battery gauge may measure, for example, the remaining capacity of the battery 696 and voltage, current, or temperature thereof while the battery 696 is charged. The battery 696 may store or generate electricity and may supply power to the electronic device 601 using the stored or generated electricity. The battery 696 may include, for example, a rechargeable battery or a solar battery.

The indicator 697 may display a specific state of the electronic device 601 or part (e.g., the AP 610) thereof, for example, a booting state, a message state, or a charging state, and the like. The motor 698 may convert an electric signal into mechanical vibration. Though not shown, the electronic device 601 may include a processing unit (e.g., a GPU) for supporting a mobile TV. The processing unit for supporting the mobile TV may process media data according to a standard, for example, a digital multimedia broadcasting (DMB) standard, a digital video broadcasting (DVB) standard, a mediaFlo™ standard, or the like.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

According to various embodiments of the present disclosure, a computer-readable storage media having instructions stored thereon in the form of a programming module may be provided. The instructions is configured to assign a reserved area of a memory of an electronic device, which receives power associated with maintaining a data write state when the supply of a main power is blocked to a file system of a RAMDisk associated with processing a data input/output (I/O) and control file processing of the file system of the RAMDisk.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer.

What is claimed is:

1. An electronic device, comprising:
   a volatile memory;
   a nonvolatile storage;
   a main battery for supplying main power to the electronic device;
   a supplementary battery; and
   a data processor in communication with the battery, the memory and the storage,
   wherein the data processor is configured to:
      when a request of a file is received by the data processor, determine whether the requested file is a first type to be processed in a synchronous write mode or a second type to be processed in an asynchronous write mode;
      based on the requested file being the first type, operate a first journaling file system (JFS) which is configured in connection with a RAMDisk based on a fixed address area reserved for the memory used as the RAMDisk;
      based on the requested file being the second type, operate a second JFS which is configured in connection with the storage; and
      supply power to the memory using the supplementary battery for maintaining a data write state of the memory when supply of the main power by the main battery is interrupted.

2. The electronic device of claim 1, wherein the data processor is configured to determine whether the requested file is the first type or the second type based on attributes or a type of the requested file, or attributes or a type of an application associated with the requested file.

3. The electronic device of claim 1, wherein the data processor is configured to format an area of the RAMDisk or a memory area associated with the RAMDisk to the first JFS and mount the first JFS.

4. The electronic device of claim 1, wherein the memory comprises at least one of:
   an area for at least one application for setting up a file type or a file name for processing a file I/O using the RAMDisk through a system call;
   an area of a virtual file system (VFS) for supporting processing of a file associated with operating the application;
   an area of a buffer file system (BFS) for controlling file processing according to the synchronous write mode and file processing according to the asynchronous write mode based on a command or attributes of the file sent via the VFS; and
   an area of the RAMDisk for processing a file requested to be processed in the synchronous write mode under the control of the BFS.

5. The electronic device of claim 1, wherein the data processor is configured to check the fixed address area of the memory and recover the RAMDisk if a rebooting process is performed after abnormal end of process of input or output of the RAMDisk.

6. The electronic device of claim 1, wherein the data processor is configured to verify a remaining space of the RAMDisk when a new file is loaded into the RAMDisk, and, if the remaining space is less than a threshold, remove a specified file from the RAMDisk based on a list associated with data written in the RAMDisk and move and store the removed file in the storage.

7. The electronic device of claim 6, wherein the data processor is configured to remove, from the RAMDisk, closed and the oldest unused files registered in the list.

8. The electronic device of claim 1, wherein the data processor is configured to perform at least one of controlling a state display associated with completing synchronization of a file stored in the RAMDisk with the storage based on occurrence of an event or determining whether file synchronization is performed based on a result of comparing a version value of a file stored in the RAMDisk with a version value of an original version of the file stored in the storage.

9. A data operation method by a data processor, the method comprising:
   when a request of a file is received, determining whether a requested file is a first type to be processed in a synchronous write mode or a second type to be processed in an asynchronous write mode;
   based on the requested file being the first type, operating a first journaling file system (JFS) which is configured in connection with a RAMDisk based on a fixed address area reserved for a volatile memory used as the RAMDisk;
   based on the requested file being the second type, operating a second JFS which is configured in connection with a nonvolatile storage; and
   supply power to the memory using a supplementary battery for maintaining a data write state of the memory when supply of main power by a main battery is interrupted.

10. The method of claim 9, wherein the controlling of the file processing of the file system of the RAMDisk comprises:
    determining whether the requested file is the first type or the second type based on attributes or a type of the requested file, or attributes or a type of an application associated with the requested file.

11. The method of claim 9, further comprising at least one of:
    formatting an area of the RAMDisk or a memory area associated with the RAMDisk for the first JFS and mounting the first JFS;
    setting up, by an application allocated to the memory, a file type or a file name for processing a file I/O using the RAMDisk through a system call;
    allocating a virtual file system (VFS) for supporting processing of a file associated with operating the application to the memory; and
    allocating a buffer file system (BFS) for controlling file processing according to a synchronous write mode and file processing according to an asynchronous write mode based on a command or attributes of a file sent via the VFS to the memory.

12. The method of claim 11, further comprising:
    sending the requested file for processing in the asynchronous write mode to the storage.

13. The method of claim 9, further comprising:
    verifying the remaining space of the RAMDisk when a new file is loaded into the RAMDisk; and
    if the remaining space is less than a threshold,
        removing a file from the RAMDisk based on a list associated with data written in the RAMDisk and moving and storing the file in the storage; and
        processing the new file based on an area obtained based on the removal of the file.

14. The method of claim 13, wherein the moving and storing of the file comprises:
    removing, from the RAMDisk, closed and the oldest unused files registered in the list.

15. The method of claim 9, further comprising:
    synchronizing a file stored in the RAMDisk with the storage upon an unmount operation of the first JFS, a read-only remount operation of the first JFS, or a freeze (suspend) operation of the first JFS; and
    displaying a recovery complete state associated with completing the synchronizing of the file stored in the RAMDisk on an area of the RAMDisk.

16. The method of claim 15, wherein the synchronizing of the file stored in the RAMDisk comprises:
    determining whether a first version value of the file stored in the RAMDisk is greater than a second version value of an original version of the file stored in the storage; and
    based on the first version value being greater than the second version value, performing of the synchronizing of the file stored in the RAMDisk with the storage.

17. The method of claim 9, further comprising:
    checking the fixed address area of the memory in a rebooting process after abnormal end of process of input or output of the RAMDisk.

18. A computer-readable storage medium having instructions stored thereon which, when executed by a processor of an electronic device, control the electronic device to:
    when a request of a file is received, determine whether a requested file is a first type to be processed in a synchronous write mode or a second type to be processed in an asynchronous write mode;
    based on the requested file being the first type, operate a first journaling file system (JFS) which is configured in connection with a RAMDisk based on a fixed address area reserved for a volatile memory used as the RAMDisk;
    based on the requested file being the second type, operate a second JFS which is configured in connection with a nonvolatile storage; and
    supply power to the memory using a supplementary battery for maintaining a data write state of the memory when supply of main power by a main battery is interrupted.

* * * * *